Patented July 13, 1948

2,444,913

UNITED STATES PATENT OFFICE 2,444,913

PREPARATION OF ZIRCONIA CONTAINING CATALYSTS

George R. Bond, Jr., Paulsboro, N. J., assignor to Houdry Process Corporation, Wilmington, Del., a corporation of Delaware No Drawing. Application May 12, 1944, Serial No. 535,396

11 Claims. (Cl. 252—254)

The present invention relates to new and improved methods for the preparation of catalysts containing zirconia and, in particular, to silicious catalysts containing zirconia such as precipitated silica-zirconia, silica-alumina-zirconia, and silica-zirconia-beryllia catalysts and the like and to new and improved methods for the catalytic conversion of hydrocarbons.

It has heretofore been proposed to employ catalysts containing zirconia in various operations. Some of the methods proposed involve the mixing of a previously prepared zirconia with another material, while other methods involve the deposition of the zirconia from an aqueous acidic zirconium salt solution on the other material, either by separate precipitation or by coprecipitation. While such methods in many instances produce desirable results, these methods lack latitude and freedom of control in some respects.

The preparation of zirconia catalysts normally involves the employment of zirconium salts such as zirconium sulfate, chloride, or nitrate or the equivalent zirconyl salts. When preparing catalysts, particularly silicious catalysts, it is frequently desirable to use a metallate composition. Thus, in the preparation of silica-alumina catalysts it has frequently been found preferable to use sodium aluminate instead of aluminum sulfate. However, sodium zirconate, if it does exist, is insoluble.

Accordingly, objects of the present invention are to provide methods of preparing zirconia catalysts which allow greater latitude in the conditions of preparation and in particular to provide methods enabling the preparation of zirconia-containing catalysts under improved conditions not possible with the methods heretofore known. Further objects are to provide improved zirconia-containing catalysts and methods of catalytic hydrocarbon conversion in which these catalysts are employed.

In accordance with a preferred form of the present invention, contact masses are produced by precipitating hydrous zirconia from an alkali metal zirconium carbonate solution, preferably in intimate relation with another material. The deposition may be by coprecipitation of the zirconia and the other material, or by precipitation of the zirconia on the other material previously prepared in moist hydrous gel or dried gel form. Catalysts so produced are employed in hydrocarbon conversion processes wherein the hydrocarbons are contacted under conversion conditions with the catalysts. Preferably the hydrocarbons treated have a boiling point above the gasoline boiling range and are cracked in the presence of the catalysts to gasoline boiling range hydrocarbons.

Preferred methods within the purview of this invention involve coprecipitation from solutions of an alkali metal zirconium carbonate and an alkaline solution of a water-insoluble oxide, in particular a soluble silicate solution, but also include aluminate solutions and other similar solutions. With respect to the double carbonate, it should be noted that it is intended to include ammonium as an alkali metal since ammonium is one of the most desirable for this purpose of the materials grouped as alkali metals. The two solutions are mixed and form a sol which may be precipitated after thorough mixture of the solutions. Precipitation may be effected by the addition of any suitable acidic material to lower the pH of the mixture, and the material may be added either prior to, during or subsequent to mixing of the solutions. In case the precipitating agent is added to one of the solutions, the other solution should be added promptly. If desired, the precipitation may be promoted by heating the mixed sol. Wide ranges of pH conditions and concentrations are possible though, in general, it is preferred to effect the precipitation at a pH in the range between 3 and 11. Active catalysts can be prepared in the low pH range below 7. It should be noted, though, that in the range above pH 7 special advantages are obtained by the invention. Thus, if a salt such as zirconium sulfate and a soluble silicate are mixed to give a pH above 7 precipitation is substantially instantaneous. However, a sol of the two may be prepared in accordance with the process of this invention whereby adequate thorough mixture is obtained and then a setting agent may be added. Hydrogels prepared at the lower pH range obtain a rather spongy structure, due to liberation of carbon dioxide, which structure promotes washing and drying of the hydrogel.

In the preparation of silica-zirconia catalysts in accordance with this invention, the alkali metal zirconium carbonate solution is added in quantity sufficient to deposit zirconia, based on total dry catalyst, in the range between 2% and 50%, preferably in an amount of about 10%.

The precipitate produced from the sol may be either a true gel embracing the total reactant solution, or it may be a gelatinous precipitate. The precipitate so produced is dried and either before or after drying it is preferably substantially freed of alkali metal compounds by washing with water or by treating with a solution of a salt which will displace the alkali metal and of which salt the cation is volatile. The alkali metal carried by the composite should be removed so that the composite is substantially free of alkali metal, i. e., the composite should contain not over about 0.5% alkali metal calculated as sodium oxide.

Another application of the present invention involves deposition of zirconia from the alkali metal zirconium carbonate solution by hydrolysis. Thus, the zirconia may be deposited by hydrolysis on an oxide which may either be a support or which may be active in the presence of zirconia. The oxide may be either a freshly precipitated hydrous oxide, or it may be a dried gel. The oxide is impregnated with the solution, which is then precipitated by hydrolysis, conveniently by heating.

The silica-zirconia composite produced according to this invention may contain substantially only silica and zirconia or, if desired, may contain other components as for example, silica-zirconia-alumina, silica-zirconia-beryllia, or silica-zirconia-alumina-beryllia.

The method of the present invention is applicable to the preparation of non-silicious catalysts as well as the silicious catalysts. Thus, this method may be employed for the preparation of zirconia-alumina or zirconia-iron catalysts. When zirconia-alumina composites are prepared, a basic sol containing alumina and zirconia may be prepared from an aluminate and the double carbonate, which is then precipitated by the addition of an acidic material. Alternatively, rapid precipitation of the two may be obtained by mixing solutions of an aluminum salt and the alkali metal zirconium carbonate. This method may be employed in the preparation of silica-zirconia-alumina catalysts by making a basic sol of soluble silicate and an alkali metal zirconium carbonate and by effecting rapid precipitation with a solution of an aluminum salt, which solution may have added thereto acid in amount sufficient to reduce the pH to the desired value between about 3 and 11. A co-precipitate of iron and zirconia is prepared in accordance with this invention by mixing solutions of an iron salt with the double carbonate.

The alkali metal zirconium carbonate is prepared by mixing an excess of alkali metal carbonate and a salt of zirconium in water. Thus, if ammonium zirconium carbonate is desired solutions of ammonium carbonate and of a salt such as zirconium sulfate are mixed, there being employed an excess of the ammonium carbonate. Preferably the solution of zirconium sulfate is added to the ammonium carbonate solution since if the ammonium carbonate is added to the zirconium sulfate a precipitate of zirconia is formed which is slow to redissolve. To prepare lithium zirconium carbonate, the zirconium salt is generally added to a suspension of lithium carbonate, a suspension being employed due to the relative insolubility of lithium carbonate. Notwithstanding this relative insolubility, the lithium zirconium carbonate is quite soluble in water.

Example 1

A catalyst was prepared containing silica and zirconia by mixing 51.3 volumes of a solution of "N-Brand" sodium silicate (28.7% $SiO_2$, 8.9% $Na_2O$ by wt.) of 1.25 specific gravity, 47.6 volumes of a solution prepared by mixing 11.37 parts by weight of zirconium sulfate, 3.75 parts by weight of ammonium carbonate and 32.3 parts by weight of water and 45.2 parts by volume of a solution prepared by mixing 8.86 parts by weight of concentrated sulfuric acid in 37.7 parts by weight of water. The mixing was effected in a continuous mixer, into which the three solutions were fed at the rate specified. The pH of the gel so formed was 6.5. The gel was synerized for 45 minutes and granulated. It was then dried in ovens at a temperature of 200 to 210° F. with cross circulation of air for 18 hours. It was then washed with water and then treated with ammonium chloride solution, substantially to eliminate sodium. It was then further washed with water, following which it was again dried at 200–210° F. The gel so formed was ground in a ball mill, following which water was added to produce a paste which was cast as pellets, which were dried. The pellets so produced were heat treated to 1400° F. for 10 hours in a mixture of 5% steam and 95% air. The heat treated catalyst was employed for the cracking of a light East Texas gas oil at a temperature of 800° F. and a rate of 31.2 liters of oil (liquid basis) per 20 liters of catalyst per hour at atmospheric pressure with no added steam. A total liquid recovery of 99.2% by volume was obtained, which yielded a 39.7% gasoline by volume of charge. 2.7% of gas and 2.0% of coke were produced.

Example 2

A catalyst was prepared from a silica-alumina coprecipitated composite which had been dried and which had been purified of sodium by water washing, following which residual sodium was removed by base exchange with ammonium chloride solution. The silica-alumina composite was treated with an ammonium zirconium carbonate solution, whereby the zirconia entered into the composite apparently by base exchange. The catalyst was then heat treated at 1400° F. for 10 hours in a mixture of 5% steam and 95% air. An active cracking catalyst was thereby prepared.

Example 3

A catalyst was prepared as follows: A lithium zirconium carbonate solution was prepared by mixing 25 parts by volume of a 6 normal lithium carbonate suspension with 16 parts by volume of a zirconium sulfate solution containing 167.4 grams per liter of zirconia. This produced a sol which was set to a gel by addition of 3 more parts by volume of the zirconium sulfate solution. The gel was dried and calcined. A catalyst was thereby prepared which was active for the molecular dehydration of alcohols and glycols.

Example 4

A catalyst was prepared as follows: A lithium zirconium carbonate sol was prepared as indicated in the above example. This was mixed with a solution of "N-Brand" sodium silicate of specific gravity 1.25 at a relative rate to give a 9:1 weight ratio of silica to zirconia. In the catalyst so prepared the sodium was removed by washing with water, following which the gel containing silica, zirconia and lithium oxide was dried and calcined under the conditions stated in Example 2. The catalyst was active in the cracking of hydrocarbon oils to gasoline.

I claim as my invention:

1. The method of preparing plural oxide catalysts containing zirconia as one of said oxides which comprises admixing an alkali metal zirconium carbonate solution with a soluble inorganic salt whose oxide is insoluble in water alone, and controlling the hydrogen ion concentration of the mixture within the range pH 3 to pH 11 to effect coprecipitation of zirconia and said insoluble oxide.

2. The method of preparing catalysts containing alumina and zirconia which comprises incorporating acidic material into a basic sol prepared from an aluminate and a solution of alkali metal zirconium carbonate, thereby effecting coprecipitation of alumina and zirconia.

3. The method according to claim 2 in which the basic sol also contains an alkali metal silicate from which silica is coprecipitated with the alumina and zirconia.

4. The method of preparing a sol containing silica and zirconia which comprises mixing an alkali metal silicate with an alkali metal zirconium carbonate solution.

5. The method in accordance with claim 4 in which the alkali metal zirconium carbonate is ammonium zirconium carbonate.

6. The method of preparing a catalyst which comprises preparing a sol containing silica and zirconia by mixing an alkali metal silicate solution and an alkali metal zirconium carbonate solution and coprecipitating silica and zirconia from said sol by the mixing therewith a solution containing an aluminum salt, whereby alumina is coprecipitated with the silica and zirconia.

7. The method of preparing a catalyst which comprises coprecipitating alumina and zirconia by mixing a solution of an aluminum salt with a solution of an alkali metal zirconium carbonate, and maintaining the pH of the mixture within the range pH 3 to pH 11.

8. The method of preparing a catalyst containing silica and zirconia which comprises preparing a sol containing silica and zirconia by mixing an alkali metal silicate solution with an alkali metal zirconium carbonate solution, and coprecipitating the silica and zirconia in said sol by the inclusion of an acidic material therein.

9. The method of preparing silica-zirconia catalysts which comprises coprecipitating silica and zirconia as a gel from an aqueous composition of an alkali metal zirconium carbonate and an alkali metal silicate, by the addition of acidic material to the aqueous composition to a pH below 7, whereby carbon dioxide liberated during said precipitation expands the gel formed.

10. The method of preparing a silica-zirconia-lithia catalyst which comprises admixing sodium silicate solution with a lithium zirconium carbonate solution thereby precipitating a gel comprising silica and zirconia and containing lithium and sodium compounds, washing the precipitate with water to remove soluble sodium compounds, drying and calcining the washed gel.

11. The method of preparing catalysts containing lithia and zirconia which comprises adding an acid-reacting zirconium salt to a lithium zirconium carbonate solution and drying and calcining the gel thereby obtained.

GEORGE R. BOND, Jr.

REFERENCES CITED

The following references are of record in the file of this patent:

UNITED STATES PATENTS

| Number | Name | Date |
|---|---|---|
| 1,682,241 | Patrick | Aug. 28, 1928 |
| 1,684,782 | Rubinstein | Sept. 18, 1928 |
| 2,203,826 | Komarewsky | June 11, 1940 |
| 2,289,918 | Lee et al. | July 14, 1942 |

FOREIGN PATENTS

| Number | Country | Date |
|---|---|---|
| 392,954 | Great Britain | May 22, 1933 |

---

Certificate of Correction

Patent No. 2,444,913.

July 13, 1948.

GEORGE R. BOND, Jr.

It is hereby certified that errors appear in the above numbered patent requiring correction as follows: In the grant, line 6, and in the heading to the printed specification, line 3, last word of the title of invention, for "CATALYSIS" read *CATALYSTS*; column 4, line 27, after "2.7%" insert *by weight*; and that the said Letters Patent should be read with these corrections therein that the same may conform to the record of the case in the Patent Office.

Signed and sealed this 9th day of November, A. D. 1948.

[SEAL]

THOMAS F. MURPHY,
*Assistant Commissioner of Patents.* and controlling the hydrogen ion concentration of the mixture within the range pH 3 to pH 11 to effect coprecipitation of zirconia and said insoluble oxide.

2. The method of preparing catalysts containing alumina and zirconia which comprises incorporating acidic material into a basic sol prepared from an aluminate and a solution of alkali metal zirconium carbonate, thereby effecting coprecipitation of alumina and zirconia.

3. The method according to claim 2 in which the basic sol also contains an alkali metal silicate from which silica is coprecipitated with the alumina and zirconia.

4. The method of preparing a sol containing silica and zirconia which comprises mixing an alkali metal silicate with an alkali metal zirconium carbonate solution.

5. The method in accordance with claim 4 in which the alkali metal zirconium carbonate is ammonium zirconium carbonate.

6. The method of preparing a catalyst which comprises preparing a sol containing silica and zirconia by mixing an alkali metal silicate solution and an alkali metal zirconium carbonate solution and coprecipitating silica and zirconia from said sol by the mixing therewith a solution containing an aluminum salt, whereby alumina is coprecipitated with the silica and zirconia.

7. The method of preparing a catalyst which comprises coprecipitating alumina and zirconia by mixing a solution of an aluminum salt with a solution of an alkali metal zirconium carbonate, and maintaining the pH of the mixture within the range pH 3 to pH 11.

8. The method of preparing a catalyst containing silica and zirconia which comprises preparing a sol containing silica and zirconia by mixing an alkali metal silicate solution with an alkali metal zirconium carbonate solution, and coprecipitating the silica and zirconia in said sol by the inclusion of an acidic material therein.

9. The method of preparing silica-zirconia catalysts which comprises coprecipitating silica and zirconia as a gel from an aqueous composition of an alkali metal zirconium carbonate and an alkali metal silicate, by the addition of acidic material to the aqueous composition to a pH below 7, whereby carbon dioxide liberated during said precipitation expands the gel formed.

10. The method of preparing a silica-zirconia-lithia catalyst which comprises admixing sodium silicate solution with a lithium zirconium carbonate solution thereby precipitating a gel comprising silica and zirconia and containing lithium and sodium compounds, washing the precipitate with water to remove soluble sodium compounds, drying and calcining the washed gel.

11. The method of preparing catalysts containing lithia and zirconia which comprises adding an acid-reacting zirconium salt to a lithium zirconium carbonate solution and drying and calcining the gel thereby obtained.

GEORGE R. BOND, JR.

REFERENCES CITED

The following references are of record in the file of this patent:

UNITED STATES PATENTS

| Number | Name | Date |
|---|---|---|
| 1,682,241 | Patrick | Aug. 28, 1928 |
| 1,684,782 | Rubinstein | Sept. 18, 1928 |
| 2,203,826 | Komarewsky | June 11, 1940 |
| 2,289,918 | Lee et al. | July 14, 1942 |

FOREIGN PATENTS

| Number | Country | Date |
|---|---|---|
| 392,954 | Great Britain | May 22, 1933 |

---

Certificate of Correction

Patent No. 2,444,913. July 13, 1948.

GEORGE R. BOND, JR.

It is hereby certified that errors appear in the above numbered patent requiring correction as follows: In the grant, line 6, and in the heading to the printed specification, line 3, last word of the title of invention, for "CATALYSIS" read *CATALYSTS*; column 4, line 27, after "2.7%" insert *by weight*; and that the said Letters Patent should be read with these corrections therein that the same may conform to the record of the case in the Patent Office.

Signed and sealed this 9th day of November, A. D. 1948.

[SEAL]

THOMAS F. MURPHY,
*Assistant Commissioner of Patents.*